United States Patent [19]
Young et al.

[11] 3,777,255
[45] Dec. 4, 1973

[54] POSITION SENSOR UTILIZING A PRIMARY AND SECONDARY SHIELDED FROM ONE ANOTHER BY A FERROMAGNETIC SHIELD AND A MAGNET WHOSE POSITION RELATIVE TO THE SHIELD CHANGES THE SHIELDING

[75] Inventors: Frederick J. Young, Swissvale; Richard A. Elco, Pittsburgh, both of Pa.

[73] Assignee: Westinghouse Electric Corporation, Pittsburgh, Pa.

[22] Filed: Oct. 26, 1972

[21] Appl. No.: 301,019

[52] U.S. Cl. ............... 324/34 PS, 324/40, 335/205, 336/45, 340/196
[51] Int. Cl. ............................................ G01r 33/00
[58] Field of Search ....................... 324/34 R, 34 PS, 324/34 D, 40; 336/45, 84, 87; 323/51, 90–92; 340/196, 365 L; 335/205

[56] References Cited
UNITED STATES PATENTS
3,020,527  2/1962  MacLaren ............................ 324/40
3,314,002  4/1967  Wellford ............................. 323/51

OTHER PUBLICATIONS
Darling, R., High Reliability Position Sensor; IBM Tech Bull., Vol. 12, No. 4, Sept. 1969. p. 536.

*Primary Examiner*—Robert J. Corcoran
*Attorney*—F. H. Henson et al.

[57] ABSTRACT

A position sensitive system including an exciting winding, a sensing winding, a ferromagnetic shield therebetween, and a magnet, the shield and the magnet being relatively movable. The magnetic skin depth is a function of the distance between the shield and the magnet, whereby voltage induced in the sensing coil by the exciting coil is a function of that distance. For any given set of parameters there will be a range wherein the depth of the magnetic skin of the shield is increased as the distance between the shield and the magnet is reduced, whereby voltage induced in the sensing coil increases as said distance decreases, and vice versa. This provides transducer capability which may be applied to proximity detection, mechanical excursion detection, and other uses. Examples of specific adaptations are as a position detector and, when coupled to either an elastic diaphragm or piston, as a pressure transducer.

11 Claims, 6 Drawing Figures

POSITION SENSOR UTILIZING A PRIMARY AND SECONDARY SHIELDED FROM ONE ANOTHER BY A FERROMAGNETIC SHIELD AND A MAGNET WHOSE POSITION RELATIVE TO THE SHIELD CHANGES THE SHIELDING

FIELD OF THE INVENTION

Within practical size limits, reluctance type transducers such as E core types are general equivalents have a relatively narrow range of voltage variation with position. A ferromagnetic transducer having a wider range of voltage variation with position is a desirable improvement. Also reluctance type transducers generally are restricted to small air gaps thus limiting the operating distance between moving elements to relatively small values. A transducer operable at greater distances between the relatively movable elements has more utility.

SUMMARY OF THE INVENTION

This invention is directed to a position sensing system wherein inductive coupling between an exciting winding and a pickup winding is varied by changing the magnetic bias applied by a magnet to a ferromagnetic shield interposed between the windings. The magnetic bias affects the incremental permeability of the shield which in turn affects the electro-magnetic skin depth of the shield. The magnetic bias level is changed by changing the positional relation between the shield and the magnet. Positional relation means the positions of the shield and the magnet relative to each other. A change in positional relation may for example be a change in the distance between the shield and the magnet, or a change in the orientation of one with respect to the other, or both. Thus, in accordance with the invention the inductive coupling between the windings is varied by changing the electro-magnetic skin depth of the ferromagnetic shield disposed between the windings as the positional relation between the shield and the magnet is changed. The voltage induced in the pickup windings by the exciting winding is a function of the skin depth and increases with increase of skin depth and vice versa.

The skin depth (S) varies inversely with the incremental permeability ($\mu_\Delta$) of the shield. The incremental permeability of the shield is a function of the positional relation, for example, the distance between the shield and the magnet. Within a predetermined distance range, the incremental permeability decreases as the distance between the shield and the magnet decreases. The magnetic bias applied to the shield by the magnet affects the incremental permeability of the shield in such a manner that within predetermined limits the incremental permeability decreases as the magnet and shield approach each other. Thus, the skin depth increases as the magnet and shield approach each other.

In accordance with one embodiment of the invention, A.C. (alternating current) is supplied to the exciting coil and a suitable voltmeter is coupled to the pickup coil. Since the voltage induced in the pickup coil by the exciting coil varies directly with the skin depth of the shield, the magnitude of the induced voltage will be a function of the distance between the magnet and the shield and within a predetermined range the voltage will increase with decrease of distance between the magnet and shield.

The system inherently is a position transducer and may for example be employed as a pressure transducer by coupling the magnet to an elastic diaphragm which interfaces with fluid under pressure and moves in response to changing pressure.

DRAWINGS

DESCRIPTION OF PREFERRED EMBODIMENTS

Figure 1:
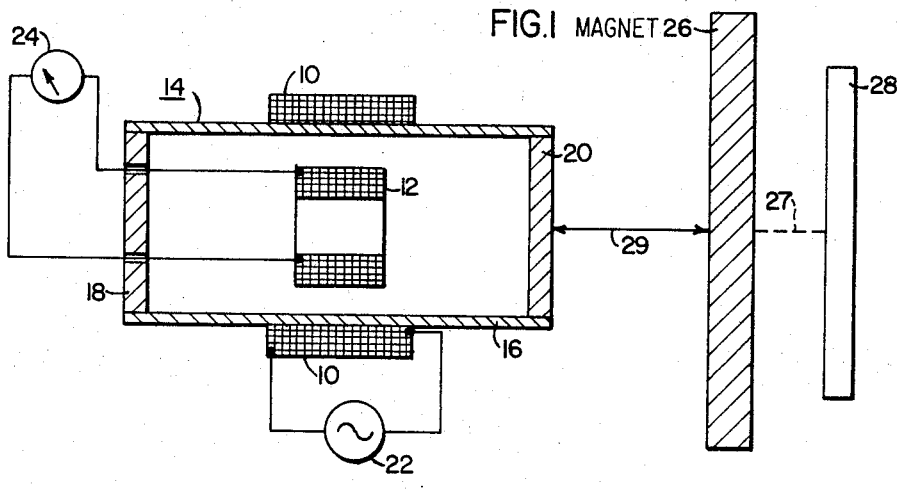
FIG. 1 is a view, part diagrammatic and part mechanical section, of a position sensitive system embodying the invention.

The position sensitive system in FIG. 1 includes windings 10 and 12 separated by a ferromagnetic shield 14 shown by way of example as an envelope having a hollow cylindrical section 16 and circular end sections 18 and 20, all made of ferromagnetic material. The end sections 18 and 20 close the ends of the cylinder 16 to form a substantially closed envelope. Also by way of example, the components 10, 12 and 16 are shown as concentric cylindrical elements, coil 10 being of insulated wire wound around the outer surface of shield 14, while coil 12 is of insulated wire fixed within the shield. Although the functions of the coils 10 and 12 may be transposed, coil 10 is shown as an exciting coil connected to an AC (alternating current) source 22, and coil 12 is shown as a sensing or detection coil connected to a suitable voltmeter 24 for registering the voltage induced in the detector coil 12 by the exciting coil 10.

Spaced from the shield 14 is a magnet 26 attached by suitable fixed connection 27 to a movable object 28 whose position is being detected. By way of example, magnet 26 is shown as a disc-shaped permanent magnet, although it could be a DC electromagnet. In the configuration of FIG. 1, the shield 14 is fixed while the magnet 26 is attached to and movable, with the object 28 toward and away from the shield 14 as indicated by the double-ended arrow 29.

Since the operation of the system involves varying the magnetic skin depth (S) by varying the incremental permeability ($\mu_\Delta$) in response to relative movement, a discussion of these terms and other related parameters is useful.

Skin depth (S) is the penetration of the surface magnetic field into the interior of a ferromagnetic body.

$$S = \sqrt{21\ \omega\sigma\mu}$$

where $\omega$ equals $2\pi F$, $\mu$ equals permeability, and $\sigma$ equals conductivity.

Incremental permeability ($\mu_\Delta$) is the permeability offered to an alternating magnetizing force superimposed upon a DC magnetizing force. It is also known as apparent permeability, or AC permeability. Incremental permeability is a function of DC magnetization. DC magnetization is the type of field that is produced by a permanent magnet or equivalent such as a DC electromagnet. Concepts of incremental permeability and magnetic skin depth are discussed in FERROMAGNETISM by Bozorth, 1951 Edition, pages 6, 7 and 771, and RADIO ENGINEERS'S HANDBOOK, by Terman, 1 st Edition, pages 91 and 92.

Figure 3:
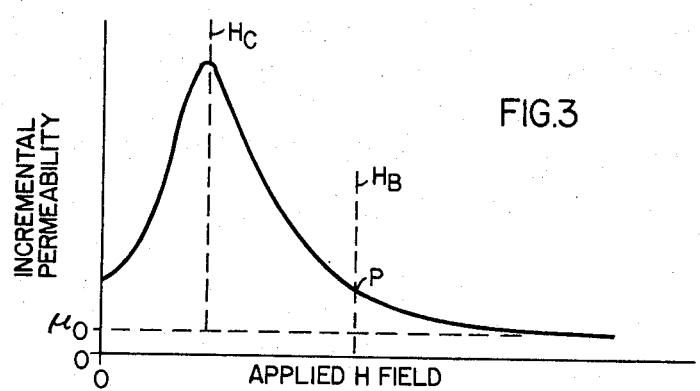
FIGS. 3, 4 and 5 illustrate curves representing certain relations associated with the systems of FIGS. 1 and 2.

When the permanent magnet 26 is not near the shielding vessel 14, i.e., when the shielding vessel is not within the effective range of the field of the magnet, the flux of the exciting coil 10 is kept out of the detection coil 12 by the ferromagnetic shielding action of the shielding vessel. For this to be true the thickness of the shielding vessel must be greater than the skin depth at any operating frequency of excitation. When the permanent magnet approaches the ferromagnetic shield, the ferromagnetic shield becomes biased by the DC magnetic field $H_B$ present as shown in FIG. 3, wherein the point P on the permeability curve is the permeability of the shield for the particular value of magnetic bias $H_B$ due to particular relative position of the permanent magnet 26. The point P is the mean incremental permeability for the particular circumstance. It may be noted that the peak of the permeability curve is substantially coincident with the coercive force $H_C$, and that a practical operating range for the system is in the range where the magnetic bias $H_B$ values are greater than the coercive force $H_C$, i.e., along the negative slope of the permeability curve (FIG. 3) for positive valued ordinates and abscissae. In this region, as may be observed in the permeability curve, the incremental permeability of the ferromagnetic shielding vessel 14 varies inversely with the magnetic bias $H_B$.

As described above the bias supplied by the approaching magnet alters the incremental permeability of the shielding vessel. When the incremental permeability is lowered, the skin depth is increased allowing flux from the exciting coil 10 to link the detection coil 12. While operating along the negative slope of the permeability curve of FIG. 3, and as the permanent magnet 26 moves closer to the shielding vessel 14, the skin depth increases, thus increasing the detection coil 12 voltage. The voltmeter 24 may be calibrated in terms of distance, position, or other suitable units. It should be understood that the permeability curve in FIG. 3 is a generalized curve not necessarily representing particular material or particular absolute values.

Figure 4:
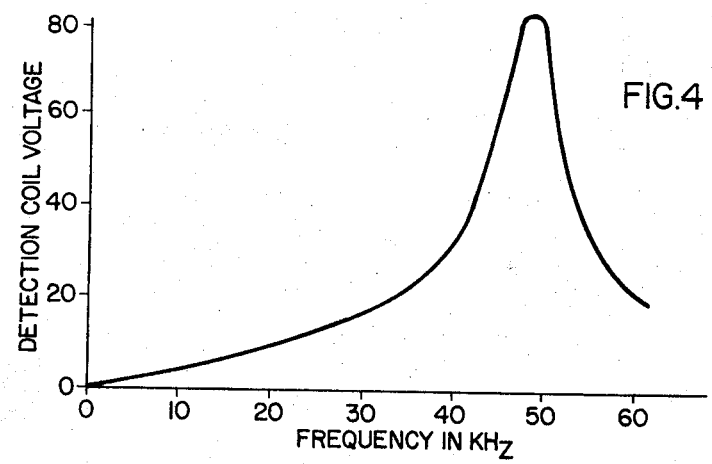

In a practical example, the tube section 16 of the ferromagnetic shield 14 was 0.014 in. thick and 2.86 in. in diameter. Both the tube and end sections 16, 18 and 20 were made of ferromagnetic material marketed under the trademark HYPERNOM. The exciting coil had 20 turns and the sensing coil located inside the ferromagnetic shield had 1,000 turns. At the surface of the permanent magnet the DC field was 500 oersteds. For this example, the curve in FIG. 4 shows the variation of the detection coil voltage as a function of frequency when the magnet 26 and shield 14 are 9 cm. apart and the current in the exciting coil is 0.5 ampere. The detection coil voltage peaks at 48 kilohertz. The curve of FIG. 4 illustrates the fact that for any given set of parameters, there is an optimum operating frequency for maximum sensitivity.

Figure 5:
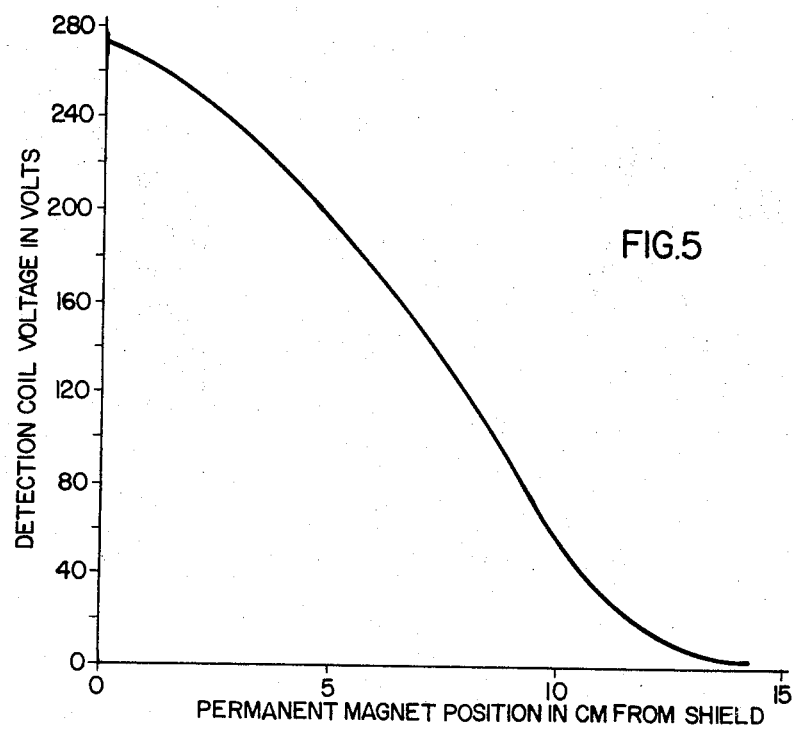

Again, for the above practical example, the curve in FIG. 5 shows the response of the ferromagnetic position indicator as a function of the position of the permanent magnet 26 with 0.5 amperes at 50 Khz in the exciting coil 10. The detection coil voltage varies from 276 volts when the permanent magnet is very close or next to the shielding vessel to 44 millivolts when the permanent magnet is 25 cm away. The response is almost linear with position over a range of 2 to 10 cm. In the range of 11 to 15 cm the response is exponential.

Figure 2:
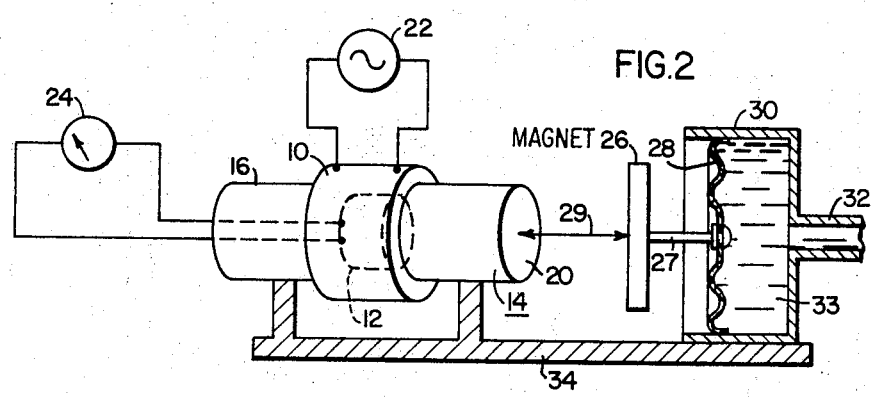
FIG. 2 shows a system of FIG. 1 exemplified in a pressure transducer.

The elements of FIG. 1 are applied in FIG. 2 to a pressure transducer. In FIG. 2, the movable object 28 whose position is to be sensed is an elastic diaphragm in one wall of a housing 30 defining a chamber connected to a pipe 32 and loaded with fluid 33 under varying pressure. The diaphragm 28 moves in accordance with pressure changes and its position at any instant is a function of the fluid pressure. The member 34 is symbolic of a frame or housing which carries the shield 14 and housing 30 in fixed relation. All the other components are the same as correspondingly numbered components in FIG. 1.

The magnet 26 being fixed to the diaphragm 28, moves therewith and operates to affect the incremental permeability and thereby the magnetic skin depth of the shield 14. As a result, the voltage induced in the pickup winding 12 is a function of the distance between the shield 14 and the magnet 26, and thereby a function of the fluid pressure to which diaphragm 28 is subjected to.

Figure 6:
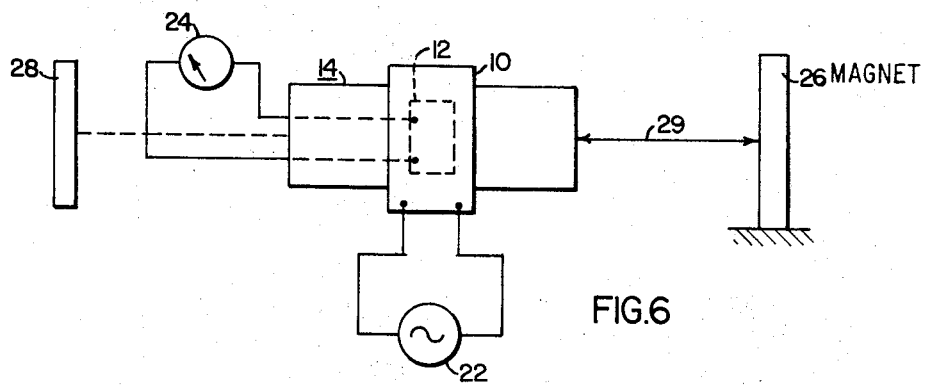
FIG. 6 shows a rearrangement of the system of FIG. 1.

It should be understood that the functions of the windings 10 and 12 may be interchanged. Also, relative movement between the shield 14 and the magnet 26 may be effected by moving the magnet, or moving the shield, or moving both, with the object 29 attached to either the shield 14 or the magnet 26, whichever is movable. For example, in FIG. 6, the object 28 whose position is being monitored is attached to the shield 14 which is movable, while the permanent magnet 26 is fixed. While it is desirable to completely envelope one of the coils by the shield, it is not necessary, and the invention may be practiced with other configurations wherein the shield is interposed between two coils to affect the coupling therebetween in response to change in magnetic skin depth resulting from change in incremental permeability due to changes in the strength of a direct (non-cyclic) magnetic field bias applied to the shield.

Although not necessary for the practice of the invention, the ferromagnetic shield 14 is preferably made of high permeability, low coercive force, rectangular hysteresis loop material, for instance iron-nickel and iron-cobalt alloys, examples of which are marketed under the trademarks of HYPERNOM, MUMETAL, PERMALLOY, etc. High permeability is desirable because the greater the permeability of the material, the smaller the skin depth. High permeability also provides wider variation in incremental permeability per unit of magnetizing force ($H_B$) thus providing wider voltage change per distance or other positional change increment.

Low coercive force factor permits the use of a weaker bias field and still have good sensitivity. Thus a smaller magnet may be used. The square loop characteristic also works to provide a wider voltage variation per unit distance or other positional change.

We claim:

1. A position sensitive system comprising first and second devices which are relatively movable with respect to each other, the first device comprising magnet means, the second device comprising first and second windings and a ferromagnetic shield interposed between said windings for controlling inductive coupling between said windings in accordance with the electromagnetic skin depth of the shield, means for supplying cyclic current to said first winding, the incremental permeability of said shield and thereby the electromagnetic skin depth being a function of the positional relation between said magnet means and said shield, whereby the voltage induced in the second winding by the first winding is a function of said positional relation, and utilization means responsive to the voltage induced in the second winding.

2. The combination as in claim 1 wherein said magnet means has a magnetic force such that, within predetermined distance limits, the incremental permeability of said shield is lowered and the skin depth increased as the distance between the magnet means and the shield is reduced.

3. The combination as in claim 1 wherein said utilization means is a voltmeter calibrated in terms descriptive of said relative movement.

4. The combination as in claim 1 wherein said magnet means is movable and an object whose position is to be detected is connected to the magnet means to displace the magnet means in response to displacement of the object.

5. The combination as in claim 1 wherein said shield is movable, and an object whose position is to be detected is connected to the shield to displace the shield in response to displacement of the object.

6. The combination as in claim 1 wherein said shield substantially envelopes one of said windings.

7. The combination as in claim 1 wherein said shield comprises a substantially closed hollow cylinder, one of said windings is within the cylinder, the other winding is outside the cylinder, and the magnet means is outside the cylinder.

8. The combination as in claim 7 wherein the windings and the peripheral wall of the cylinder are coaxial.

9. The combination as in claim 7 wherein the windings and the peripheral wall of the cylinder are concentric.

10. A position sensitive system comprising:
A. first and second windings arranged for inductive coupling therebetween;
B. means for supplying cyclic current to the first winding;
C. a ferromagnetic shield interposed between said windings for controlling the amount of inductive coupling between the windings in dependence upon the magnetic skin depth of the shield;
D. magnet means for affecting the permeability and thereby the skin depth of the shield in accordance with the relative positions of the shield and the magnet means, said shield and magnet means being relatively movable with respect to each other; and
E. utilization means responsive to the voltage induced in the second winding by the first winding.

11. The combination as in claim 10 wherein one of said shield and said magnetic means is movable, and an object whose position is to be monitored is connected to said movable one.

* * * * *